US011921239B2

(12) United States Patent
Goldberg et al.

(10) Patent No.: US 11,921,239 B2
(45) Date of Patent: *Mar. 5, 2024

(54) METHODS AND SYSTEMS FOR CALIBRATION OF MULTIPLE LIDAR DEVICES WITH NON-OVERLAPPING FIELDS OF VIEW

(71) Applicant: IKE ROBOTICS, INC., San Francisco, CA (US)

(72) Inventors: Joshua David Goldberg, San Francisco, CA (US); Jur Van Den Berg, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 857 days.

This patent is subject to a terminal disclaimer.

(21) Appl. No.: 17/008,454

(22) Filed: Aug. 31, 2020

(65) Prior Publication Data

US 2021/0215809 A1    Jul. 15, 2021

Related U.S. Application Data

(63) Continuation of application No. 16/744,023, filed on Jan. 15, 2020, now Pat. No. 10,802,122.

(51) Int. Cl.
*G01C 3/08* (2006.01)
*B60R 11/00* (2006.01)
(Continued)

(52) U.S. Cl.
CPC .............. *G01S 7/497* (2013.01); *B60R 11/00* (2013.01); *G01S 7/4811* (2013.01);
(Continued)

(58) Field of Classification Search
None
See application file for complete search history.

(56) References Cited

U.S. PATENT DOCUMENTS 9,329,269 B2    5/2016  Zeng
9,916,703 B2    3/2018  Levinson et al.
(Continued)

FOREIGN PATENT DOCUMENTS

DE     102018132805 A1 *  6/2020  ........... G01S 7/4808

OTHER PUBLICATIONS

Gao et al., "On-line Calibration of Multiple LIDARs on a Mobile Vehicle Platform", 2010 IEEE International Conference on Robotics and Automation, 2010, 6 pages.
(Continued)

*Primary Examiner* — Mark Hellner

(57) ABSTRACT

A method and a system of calibration of a first lidar device and a second lidar device are described. A subset of pairs of positions of a vehicle as the vehicle moves along a path according to a predetermined path pattern are determined. Each pair from the subset of pairs includes a first position and a second position of the vehicle. A first field of view of the first lidar device when the vehicle is located at the first position overlaps with a second field of view of the second lidar device when the vehicle is located at the second position at a second time. Based on the subset of pairs, an extrinsic calibration transformation that transforms a position of the second lidar device into a calibrated position that allows to obtain a consistent view of the world between the first and the second lidar devices is determined.

20 Claims, 10 Drawing Sheets

(51) Int. Cl.
*G01S 7/481* (2006.01)
*G01S 7/484* (2006.01)
*G01S 7/497* (2006.01)
*G01S 17/42* (2006.01)
*G01S 17/931* (2020.01)

(52) U.S. Cl.
CPC ............ *G01S 7/4817* (2013.01); *G01S 7/484* (2013.01); *G01S 17/42* (2013.01); *G01S 17/931* (2020.01)

(56) References Cited

U.S. PATENT DOCUMENTS

| | | | |
|---|---|---|---|
| 11,714,193 B1* | 8/2023 | Foster | G01S 7/4972 356/4.01 |
| 2008/0033645 A1 | 2/2008 | Levinson et al. | |
| 2015/0379766 A1 | 12/2015 | Newman et al. | |
| 2018/0284286 A1 | 10/2018 | Eichenholz et al. | |
| 2020/0064483 A1 | 2/2020 | Li et al. | |
| 2020/0145569 A1 | 5/2020 | Wheeler et al. | |

OTHER PUBLICATIONS

Heide et al., "Calibration of multiple 3D LiDAR sensors to a common vehicle frame", Fraunhofer Institute of Optronics, System Technologies and Image Exploitation IOSB, Jun. 20-21, 2018, pp. 372-379.

Notice of Allowance, U.S. Appl. No. 16/744,023, dated Jul. 23, 2020, 10 pages.

Nouira et al., "Target-Free Extrinsic Calibration of a Mobile Multi-Beam Lidar System", ISPRS Annals of the Photogrammetry, Remote Sensing and Spatial Information Sciences, vol. II-3/W5, 2015, pp. 97-104.

Pereira et al., "Automatic Calibration of Multiple LIDAR Sensors Using a Moving Sphere as Target", Advances in Intelligent Systems and Computing, University of Aveiro, 2016, pp. 477-478.

Pusztai et al., "Accurate Calibration of Multi-LiDAR-Multi-Camera Systems", Sensors, 2018, vol. 18, pp. 1-22.

* cited by examiner

CONVERT THE FIRST SUBSET OF THE LIDAR RETURNS [FROM THE FIRST LIDAR COORDINATE SYSTEM WHEN THE VEHICLE WAS LOCATED AT THE FIRST POSITION] INTO A CONVERTED FIRST SUBSET OF THE LIDAR RETURNS IN THE FIRST LIDAR COORDINATE SYSTEM OF THE FIRST LIDAR DEVICE WHEN THE VEHICLE WAS LOCATED AT THE SECOND POSITION
322

CONVERT THE SECOND SUBSET OF THE LIDAR RETURNS [FROM A SECOND LIDAR COORDINATE SYSTEM WHEN THE VEHICLE WAS LOCATED AT THE SECOND POSITION] INTO A CONVERTED SECOND SUBSET OF THE LIDAR RETURNS IN THE FIRST LIDAR COORDINATE SYSTEM WHEN THE VEHICLE WAS LOCATED AT THE SECOND POSITION
324

CALCULATE, BASED ON THE CONVERTED FIRST SUBSET OF THE LIDAR RETURNS AND THE CONVERTED SECOND SUBSET OF THE LIDAR RETURNS, THE ESTIMATE OF THE TRANSFORMATION
326

Figure 3C

TRANSFORM BASED ON THE EXTRINSIC CALIBRATION TRANSFORMATION A THIRD SUBSET OF THE LIDAR RETURNS RECORDED BY THE SECOND LIDAR DEVICE TO OBTAIN A CALIBRATED THIRD SUBSET OF THE LIDAR RETURNS
332

AGGREGATE THE CALIBRATED THIRD SUBSET OF THE LIDAR RETURNS WITH A FOURTH SUBSET OF THE LIDAR RETURNS RECORDED BY THE FIRST LIDAR DEVICE INTO A THREE-DIMENSIONAL GRID OF CELLS THAT IS REPRESENTATIVE OF THE ENVIRONMENT
334

DETERMINE THE INTRINSIC CALIBRATION TRANSFORMATION BASED ON LIDAR RETURNS FROM THE THIRD SUBSET AND THE FOURTH SUBSET THAT HIT A SAME CELL IN THE THREE-DIMENSIONAL GRID OF CELLS
336

Figure 3D

METHODS AND SYSTEMS FOR CALIBRATION OF MULTIPLE LIDAR DEVICES WITH NON-OVERLAPPING FIELDS OF VIEW

CROSS-REFERENCE TO RELATED APPLICATIONS

This application is a continuation of application Ser. No. 16/744,023, filed Jan. 15, 2020, which is hereby incorporated by reference.

TECHNICAL FIELD

Embodiments of the invention relate to the field of autonomous vehicles; and more specifically, to the calibration of multiple lidar devices with non-overlapping fields of view.

BACKGROUND ART

Light Detection and Ranging (LIDAR) devices are used for measuring the distance to a target by illuminating the target with laser light and measuring the reflected light (also referred to as laser returns). Differences in laser return times and wavelengths are used to make digital three-dimensional (3D) representations of the target. Several applications use multiple lidar devices located at different positions that are used to obtain a 3D representation of the same world. For example, multiple lidar devices can be positioned on a vehicle and may allow an autonomous driving system to obtain a 3D representation of the world in which the vehicle moves.

Before a lidar device is used to determine the 3D representations of objects, calibration parameters are determined. The calibration needs to be performed for all the lidar devices positioned on a vehicle to obtain point clouds representative of objects which have consistent intensity values, and ensure that the locations of the objects detected in the environment are collocated between lidar devices. Poorly calibrated lidar devices result in aliasing of environment objects (e.g., walls are smeared or duplicated) and a single object may have a large distribution of intensity values. Modules that consume point clouds of lidar devices will perform poorly in various ways when the calibration parameters do not result in a consistent view of the world between the multiple lidar devices.

When the fields of view of the multiple lidar device overlap, calculation of the calibration parameters of the multiple lidar devices is straightforward. A vehicle on which the multiple lidar devices are mounted is stationed at a given location, light is emitted from the multiple lidar devices, lidar returns are recorded for each one of the lidar devices, and a match is performed between the multiple lidar returns to solve the calibration problem. Given that the fields of view of the multiple lidar devices overlap, the calibration parameters are determined based on the overlapping point clouds recorded by the multiple lidar devices. In contrast, when fields of view of the lidar devices do not overlap, the calibration mechanism described above cannot be performed as there are no overlapping point clouds.

BRIEF DESCRIPTION OF THE DRAWINGS

The invention may best be understood by referring to the following description and accompanying drawings that are used to illustrate embodiments of the invention. In the drawings:

FIG. 3C illustrates a flow diagram of exemplary operations for transformation estimation, according to some embodiments.

FIG. 3D illustrates a flow diagram of exemplary operations for determining an intrinsic calibration, according to some embodiments.

DETAILED DESCRIPTION

Figure 1A:
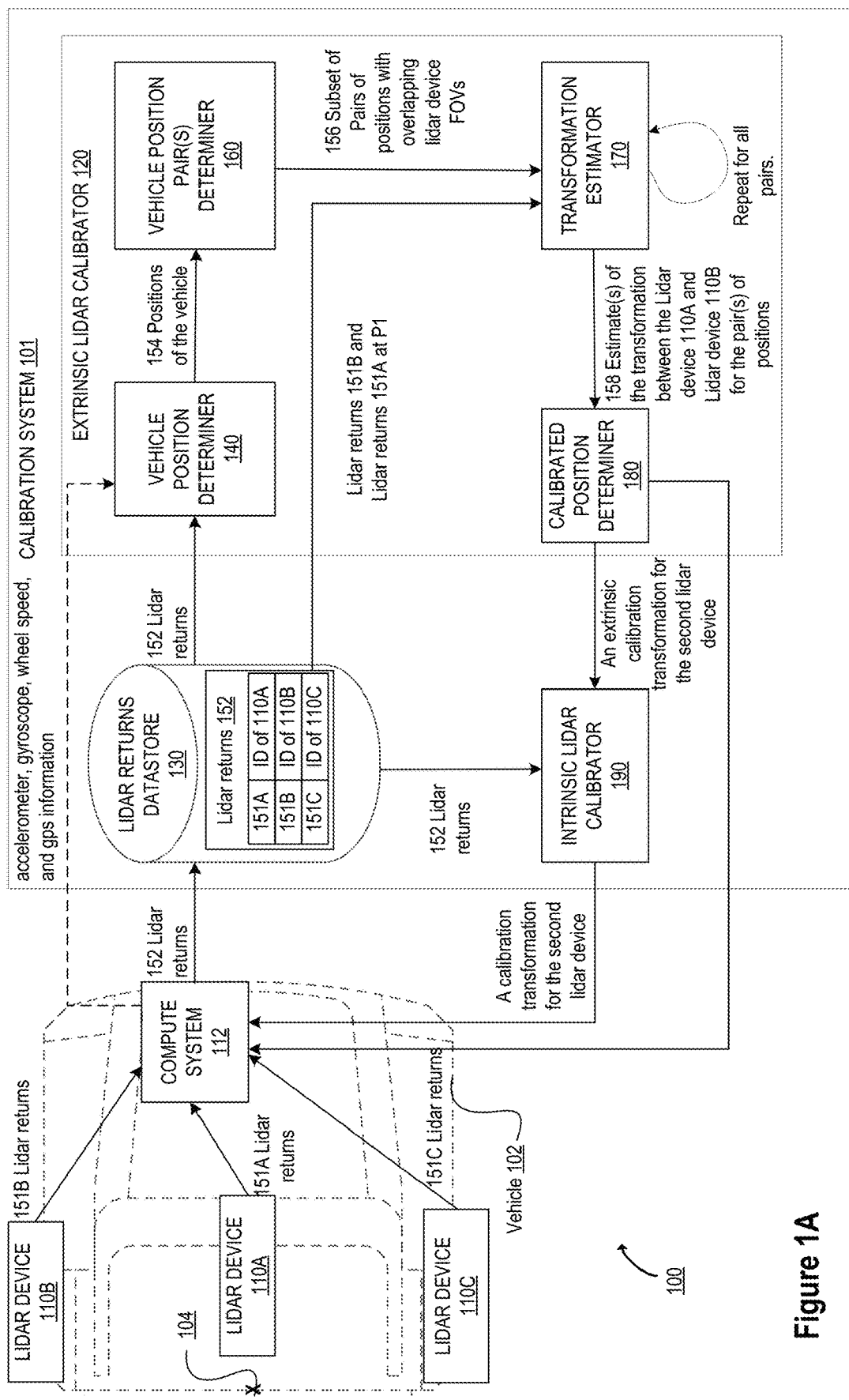
FIG. 1A illustrates a block diagram of an exemplary system that can be used for calibration of multiple lidar devices with non-overlapping fields of view, according to some embodiments of the invention.

The following description describes methods and apparatus for calibration of multiple lidar devices with non-overlapping fields of view. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate-level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and a system of calibration of a first lidar device and a second lidar device from multiple lidar devices that are mounted on a vehicle are described. Lidar returns recorded by the first lidar device and the second lidar device are received as the vehicle moves along a path according to a predetermined path pattern in an environment. Based on a subset of the lidar returns that are recorded by the first lidar device, positions of the vehicle are determined with respect to a world coordinate system along the predetermined path pattern. A subset of pairs of the positions of the vehicle is determined. Each pair from the subset of pairs includes a first position and a second position of the vehicle, where a first field of view (FOV) of the first lidar device when the vehicle is located at the first position at a first time overlaps with a second field of view of the second lidar device when the vehicle is located at the second position at a second time. For each pair from the subset of pairs of the positions, an estimate of transformation is determined between a first subset of the lidar returns recorded by the first lidar device when the vehicle was located at the first position and a second subset of the lidar returns recorded by the second lidar device when the vehicle was located at the second position to produce a plurality of estimates of transformations for the pairs of the positions. Based on the plurality of estimates of the transformations, an extrinsic calibration transformation is determined. The extrinsic calibration transformation transforms a position of the second lidar device on the vehicle into a calibrated position of the second lidar device that allows to obtain a consistent view of the world between the first lidar device and the second lidar device.

The embodiments described herein enable calibration of at least two lidar devices mounted on a vehicle to be performed regardless of whether or not the FOV of the lidar devices overlap when the vehicle is at a given position. In particular, the embodiments described herein allow for an efficient and accurate calibration of two lidar devices when the FOV of these lidar devices does not overlap when the vehicle is at a given position. The vehicle is caused to move a path that generates multiple pairs of positions of the vehicle where two lidar devices will have overlapping fields of view. The overlap of the fields of view over time (e.g., two different positions at two different times) is used to calibrate the two lidar devices.

The extrinsic calibration can be used to calibrate lidar returns output by the second lidar device with respect to the first lidar device. These calibrated lidar returns are used in combination with lidar returns of the first lidar device to obtain a consistent and coherent view of the environment that surrounds the vehicle as the vehicle moves. This view can be used for accurate route planning and/or path planning for the vehicle.

In the following description the embodiments of FIGS. 1A-C and FIGS. 3A-4 will be described with reference to the exemplary environment and vehicle of the block diagrams of FIGS. 2A-B. However, the illustrated environment, vehicle, and path along which the vehicle moves are intended to be exemplary only. One of ordinary skill in the art would understand that a vehicle may move in a different environment, the vehicle can be different (e.g., a car instead of a truck), and the path along which the vehicle moves can be different.

Figure 2A:
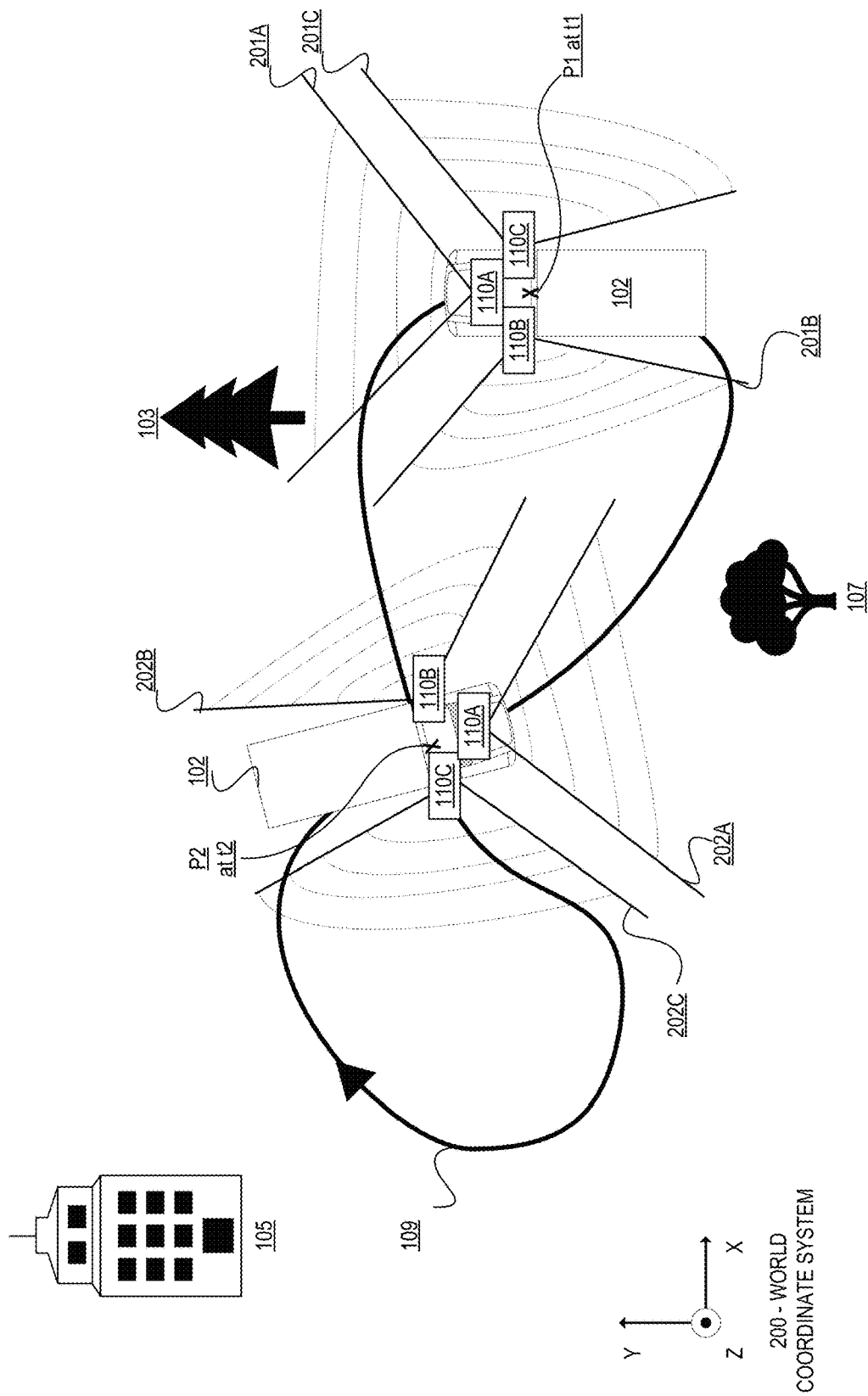
FIG. 2A illustrates a block diagram of an exemplary vehicle moving according to a predetermined path pattern, according to some embodiments.

FIG. 1A illustrates a block diagram of an exemplary system 100 that can be used to perform calibration of multiple lidar devices, in accordance with some embodiments. The system 100 includes a vehicle 102 on which a set of lidar devices 110A-C are mounted. The vehicle further includes a compute system 112 and is coupled with a calibration system 101. The vehicle 102 can be any type of motor vehicle that transports people or cargo. For example, the vehicle can be a car, a truck, or a bus, etc. In some embodiments, the vehicle 102 can be a truck that is to be coupled with a trailer. The position of the vehicle 102 is defined as a position of a reference point on the vehicle. For example, the point 104 is the reference point on the vehicle and is used to identify the position of the vehicle at a given time $t_i$. In some embodiments, a reference point on the vehicle can be a center of a rear-drive axle of the vehicle, or any other point on the vehicle. In some embodiments, the vehicle 102 can be a self-driving vehicle, which is also known as an autonomous vehicle (AV), a connected and autonomous vehicle (CAV), driverless car, robo-car, or robotic vehicle. In some embodiments, the vehicle 102 can be a fully automated vehicle, where the vehicle is operative to move without any assistance or intervention of a driver. Alternatively, the vehicle 102 can be a semi-autonomous vehicle, which can also be referred to as assisted-driving vehicle, where the operation of the vehicle relies on some degree of automation, while still having a driver in charge of the vehicle.

The operations of the embodiments herein will be described with reference to the environment of FIGS. 2A-B; however, one of ordinary skill in the art would understand that this environment is exemplary only and should not be viewed as a limitative. The vehicle may include a set of sensor devices for collecting data on the environment surrounding the vehicle when the vehicle is moving. The collected data can be used for enabling autonomous and/or assisted driving of the vehicle. In some embodiments, the vehicle may include multiple types of sensors, e.g., one or more cameras, one or more radars. The vehicle may include additional sensors that are not listed.

In some embodiments, the vehicle 102 may include multiple lidar devices, e.g., 110A, 110B, 110C. A lidar device measures the distance to a target using active sensors which emit light for illumination, instead of relying on sunlight. The lidar device fires rapid pulses of laser light at a surface—anything up to 150,000 pulses a second. When the light hits the target object, it is reflected back to a sensor which measures the time taken for the pulse to hit and return from the target object. The distance to the object is deduced by using the speed of light to calculate the distance traveled accurately. The result is lidar returns that provide precise three-dimensional information about the target object and its surface characteristics.

Each one of the lidar devices 110A-C is located at a given position with respect to the reference point 104 and has a respective FOV. Each one of the lidar devices is located at a position that is different from the position of another one of the lidar devices. In some implementations, at least two of the lidar devices 110A-C have respective fields of view that do not overlap. FIG. 2A illustrates an exemplary deployment of the vehicle in the world with the different fields of view of the multiple lidar devices 110A-C. As shown in FIG. 2A, when the vehicle 102 is at a first position P1 at time t1, the FOV 201A of the first lidar device 110A covers an area that is in front of the vehicle and does not overlap with either of the FOVs of the second lidar device 110B and the third lidar device 110C, respectively FOV 201B and FOV 201C. FOV 201B of the second lidar device 110B covers an area to a side of the vehicle (e.g., driver side), and does not overlap with either of the FOVs 201A and 201C of the first lidar device 110A and the third lidar device 110C respectively. The FOV 201C of the third lidar device 110C covers an area to a side of the vehicle (e.g., passenger side), and does not overlap with either of the FOVs 201A and 201B of the first lidar device 110A and the second lidar device 110B respectively. As shown in FIG. 2A, when the vehicle 102 is at a second position P2 at time t2, the FOV 202A of the first lidar device 110A covers an area that is in front of the vehicle and does not overlap with either of the FOVs of the second lidar device 110B and the third lidar device 110C, respectively FOV 202B and FOV 202C. FOV 202B of the second lidar device 110B covers an area to a side of the vehicle (e.g., driver side), and does not overlap with either of the FOVs 202A and 202C of the first lidar device 110A and the third lidar device 110C respectively. The FOV 202C of the third lidar device 110C covers an area to a side of the vehicle (e.g., passenger side), and does not overlap with either of the FOVs 202A and 202B of the first lidar device 110A and the second lidar device 110B respectively.

Each one of the lidar devices 110A-C transmits to the calibration system 101 lidar returns captured during the motion of the vehicle along the path 109. Each lidar return includes coordinates of a point on an obstacle detected by the lidar device during a scanning operation. The coordinates can be spherical coordinates (e.g., range, azimuth angle, and elevation angle), or cartesian coordinates (x, y, z). The lidar returns 152 are expressed in the lidar coordinate system of the lidar by which they are captured. Lidar returns 152 are stored in their respective lidar coordinate system. For example, the lidar returns 151A that are captured by the lidar device 110A are stored in a first lidar coordinate system of the lidar device 110A. In some embodiments, the first lidar coordinate system is centered at the position of the lidar device 110A. The lidar returns 151B that are captured by the lidar device 110B are stored in a second lidar coordinate system of the lidar device 110B. In some embodiments, the second lidar coordinate system is centered at the position of the lidar device 110B. The lidar returns 151C that are captured by the lidar device 110C are stored in the third lidar coordinate system of the lidar device 110C. In some embodiments, the third lidar coordinate system is centered at the position of the lidar device 110C. While, in some embodiments, each one of the first, second, and third lidar coordinate systems is centered at a respective position of the first, second, and third lidar devices on the vehicle, in other embodiments, each one of the lidar coordinate systems can be located at a different position with respect to the lidar device they are associated with.

In addition, the lidar returns 151A-C are respectively associated with an identifier of the lidar device that captured the lidar returns. Lidar returns 151A are associated with the identifier of the lidar device 110A. Lidar returns 151B are associated with the identifier of the lidar device 110B, and lidar returns 151C are associated with the ID of the lidar device 110C.

The compute system 112 is an electronic device that is coupled with the lidar devices 110A-C and is operative to receive the lidar returns 151A-C. The compute system 112 is further operative to transmit the lidar returns 152, which includes lidar returns from each one of the lidar devices 110A-B, to the calibration system 101. In some embodiments, the compute system 112 may include the calibration system 101. In other embodiments, the calibration system 101 is located remotely from the compute system 112 and transmitting the lidar returns can be performed through a wireless network (e.g., cellular network, Wi-Fi network, etc.) or through a wired network after the lidar returns are collected. Each one of the lidar returns can be associated with the identifier of one of the lidar returns and is transmitted with this identifier to the calibration system 101.

The calibration system 101 includes an extrinsic lidar calibrator 120, an intrinsic lidar calibrator 190, and a lidar returns datastore 130. The calibration system 101 is operative to perform a calibration of the lidar devices 110A-C. The calibration is performed to obtain calibration parameters that include intrinsic calibration parameters and extrinsic calibration parameters. The intrinsic calibration parameters of a lidar device refer to how the system interprets the raw intensity measurements from the lidar devices. These parameters include a scaling on raw intensity, a scaling on range, and a constant offset. Extrinsic calibration parameters specify where the lidar device is physically located with respect to a fixed/reference point on the vehicle. These parameters include an x/y/z translation (e.g., which can be expressed in meters) and a roll/pitch/yaw rotation (e.g., which can be expressed in radians). In the embodiments described herein the intrinsic lidar calibrator 190 is used to determine the intrinsic calibration parameters and the extrinsic lidar calibrator 120 is used to determine the extrinsic calibration parameters.

In some embodiments, the calibration operation can be performed once prior to deployment of the vehicle. In other embodiments, the calibration operation can be performed periodically, prior to and following the deployment of the vehicle. In some embodiments, the vehicle can include only two lidar devices, e.g., lidar devices 110A-B. In these embodiments, the calibration is performed between the two lidar device 110A-B, where one of the lidar devices is selected as a reference for the other one. In other embodiments, the vehicle can include more than two lidar devices, e.g., lidar devices 110A-C or more. In these embodiments, the calibration is performed between each pair of lidar devices, where the same lidar device is selected as a reference for all of the pairs.

The calibration is initiated at a given time. When the calibration is initiated, the vehicle is caused to move along a predetermined path pattern, e.g., path 109. The predetermined path pattern causes the lidar devices 110A-C to collect lidar returns with FOV that overlap over time. In some embodiments, the path pattern can have the shape of the path 109. In other embodiments, the path pattern can have a different shape. For example, the pattern of the path 109 can be a circle, or any closed curve that causes the multiple lidar devices 110A-C to obtain overlapping fields of view over time. For example, the pattern of the path 109 causes FOV 201A of lidar device 110A when the vehicle is at the position P1 at time t1 to overlap with the FOV 202B of lidar device 110B when the vehicle is at the position P2 at time t2. When the vehicle is at position P1 at time t1, FOV 201B of lidar device 110B overlaps with FOV 202B when the vehicle is at operation P2 at time t2. In some embodiments, the pattern of the path 109 may cause a total overlap of FOVs of two different lidar devices. In other embodiments, the path pattern may cause a partial overlap of FOVs of two different lidar devices. In some embodiments, for the vehicle to move along the path 109, a driver may manually drive the vehicle according to the predetermined path. In other embodiments, the self-driving element of the vehicle can be configured to cause the vehicle to move along the path 109 with or without the presence and assistance of a driver. In other embodiments, the vehicle can be configured to move along a different path.

The lidar devices 110A-C record the lidar returns 152 (which includes 151A-C) when the vehicle moves along the path 109. The lidar return datastore 130 stores the lidar returns as received from the compute system 112. The lidar returns 152 are then retrieved from the lidar returns datastore 130 to be used by the extrinsic lidar calibrator 120 and the intrinsic lidar calibrator 190 during the calibration process.

The vehicle position determiner 140 is operative to determine, based on a subset of the lidar returns 152 that are recorded by the first lidar device, positions of the vehicle 102 with respect to a world coordinate system along the path 109. The vehicle position determiner 140 selects from the set of lidar returns 152, the subset of the lidar returns. The subset of lidar returns are lidar returns of a single lidar device. For example, vehicle position determiner 140 selects, from the set of lidar returns 152, the lidar returns 151A of the first lidar device 110A. In some embodiments, the lidar returns 151A are selected based on the identifier of the first lidar device 110A. In this embodiment, all lidar returns stored in the datastore 130 associated with the identifier of the lidar device 110A are retrieved by the vehicle position determiner 140. The lidar device 110A can be identified as the reference lidar device for performing the calibration between the lidar devices 110A-C. The embodiments herein will be described with reference to the first lidar device 110A and the second lidar device 110B, however, one of ordinary skill in the art would understand that similar operations are performed for the third lidar device 110C for calibrating the third lidar device 110C with respect to the first lidar device 110A.

The lidar returns 151A of the lidar device 110A are used by the vehicle position determiner 140 to determine positions of the vehicle in the world. For example, the positions of the vehicle can be determined in a global coordinate system. The world coordinate system 200 in FIG. 2A is representative of an exemplary world coordinate system in which the positions of the vehicle can be expressed. The positions of the vehicle 102 can be the positions of the reference point 104 taken over time when the vehicle moves along the path 109. In some embodiments, the vehicle position determiner 140 can use the lidar returns 151A expressed in the first lidar coordinate system 211A (illustrated in FIG. 2B) of the lidar device 110A to determine the positions of the vehicle. In an alternative embodiment, the vehicle position determiner 140 can use the lidar returns 151A expressed in the vehicle coordinate system 201 (FIG. 2A). In some embodiments, the determination of the positions of the vehicle in the world based on the lidar returns 151A can be performed based on a simultaneous localization and mapping (SLAM) method.

The positions 154 of the vehicle in the world are used by the vehicle position pair(s) determiner to determine a subset of pairs of the positions of the vehicle. Each pair from the subset of pairs includes a first position and a second position of the vehicle, and a first FOV of the first lidar device 110A when the vehicle is located at the first position P1 at a first time t1 overlaps with a second FOV of the second lidar device 110B when the vehicle is located at the second position P2 at a second time t2. FIG. 2B illustrates a block diagram illustrating exemplary overlapping fields of view of lidar devices of a vehicle, according to some embodiments. The vehicle position pair(s) determiner 160 can be implemented as discussed in further detail with reference to FIG. 1B. The vehicle position pair(s) determiner 160 may determine a first pair of positions (P1, P2), where each position of the pair is associated with a respective one of the lidar devices, e.g., lidar device 110A for position Pb, and lidar device 110B for position P2. The FOV 201A of lidar device 110A when the vehicle is at position P1 at time t1 overlaps with the FOV 202B of lidar device 110B when the vehicle is at position P2. While a single pair of positions will be discussed in further details below, the vehicle position pairs determiner 160 outputs a subset of pairs of the vehicle, where for each pair from the subset of pairs a first position of the pair is associated with a lidar device and a second position of the pair is associated with another lidar device that is different from the lidar device, and where the FOVs of each one of the lidar device and the other lidar device overlap.

The subset 156 of pairs of positions of the vehicle are used by the transformation estimator 170. The transformation estimator 170 determines, for each pair from the subset of pairs of the positions, an estimate of transformation between a first subset of the lidar returns 151A recorded by the first lidar device 110A when the vehicle was located at the first position P1 and a second subset of the lidar returns 151B recorded by the second lidar device 110B when the vehicle was located at the second position P2 to produce multiple estimates of transformations for the pairs of the positions. For example, the transformation estimator 170 determines a transformation based on lidar returns recorded by the first lidar device 110A and lidar returns recorded by the second lidar device 110B. The transformation maps the points forming the tree 103 as seen by the second lidar device 110B when the vehicle is at P2 into the points of the tree 103 as seen by the first lidar device 110A when the vehicle is at P1. This transformation is applied to the position of the lidar device 110B to generate a transformed position of the second lidar device 110B at time t2. In some embodiments, the output of the transformation estimator 170 may be the transformed position of the lidar device 110B for the pair (P1 (lidar device 110A), P2 (lidar device 110B)). In some embodiments, the output of the transformation estimator 170 may be the transformation that maps the position of the lidar device 110B to the transformed position of the lidar device 110B for the pair (P1 (lidar device 110A), P2 (lidar device 110B)). In some embodiments, the transformation estimator 170 repeats this process for each pair of the subset of pairs 156 and outputs multiple estimates 158 of the transformation. Each transformation estimates a position of the lidar device 110B that provides a consistent view of the world between the first lidar device 110A and the second lidar device 110B. The consistent view of the world is obtained when the objects in the environment detected by the first lidar device 110A have the same positions as when detected with the second lidar device 110B.

The multiple estimates of the transformation are used by the calibrated position determiner 180 to determine an extrinsic calibration transformation that transforms a position of the second lidar device on the vehicle into a calibrated position of the second lidar device that allows to obtain a consistent view of the world between the first lidar device and the second lidar device. The determination of the extrinsic calibration transformation includes performing an optimization across all of the estimates of the transformation determined for all the pairs of the subset of pairs 156 to find a transformation that minimizes the error across all of the estimates.

The calibration system is operative to transmit the calibration transformation and the extrinsic calibration transformation to the compute system 112 for calibrating the second lidar device 110B. In some embodiments, the extrinsic lidar calibrator 120 may transmit to the compute system 112 the transformed position of the second lidar device 110B instead of the extrinsic calibration. In some embodiments, instead of transmitting two distinct transformations, the extrinsic transformation and the calibration transformation, the calibration system 101 may transmit an aggregate transformation that concurrently applies the two transformations to lidar returns of the lidar device 110B. The second lidar device 110B is calibrated with respect to the first lidar device 110A. The calibration process performed by the calibration system 101 is repeated for each additional lidar device, e.g., lidar device 110C, for obtaining a calibration transformation and extrinsic calibration transformation associated with the additional lidar device. Upon receipt of the calibration transformation and the extrinsic calibration transformation (or transformed position of the second lidar device 110B), the compute system 112 is operative to process lidar returns captured by the lidar device 110B as transformed, based on the calibration transformation and the extrinsic calibration transformation. The transformed lidar returns or calibrated lidar returns of the second lidar device 110B allows the generation of a view of the environment of the vehicle 102 that is consistent across the two lidar devices 110A-B. In a consistent or coherent view of the environment, the same object, e.g., tree 103, is seen at the same location in the world when viewed by the first lidar device 110A and the second lidar device 110B after calibration. In some embodiments, the consistent and coherent view of the world enables the compute system to accurately use the outputs of the lidar devices to detect obstacles, localize against a map, plan a route for the vehicle, and perform other operations.

Figure 1B:
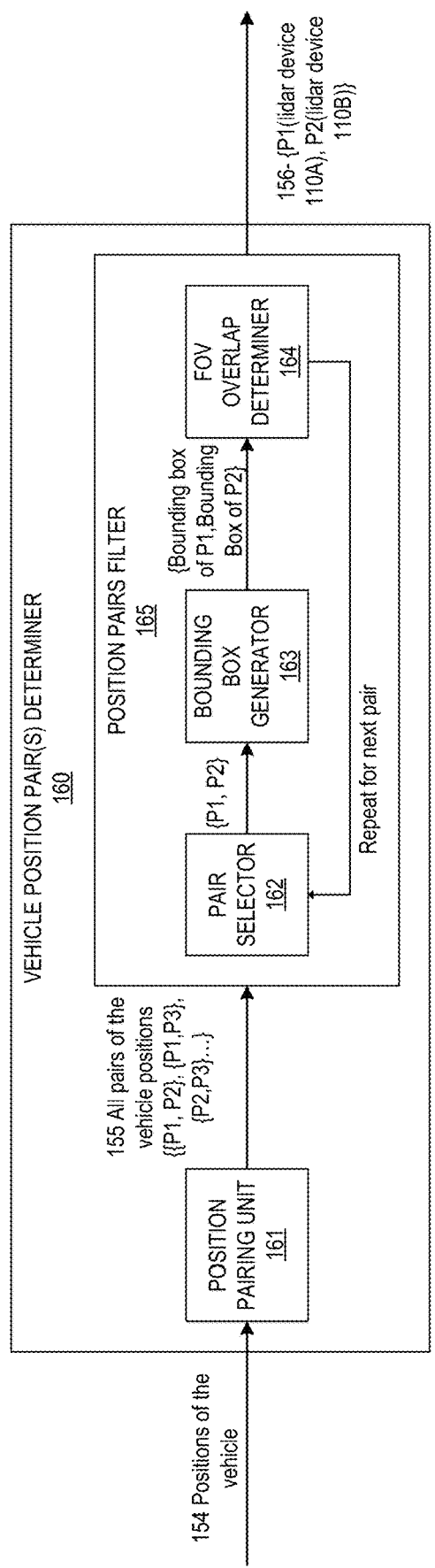
FIG. 1B illustrates a block diagram of an exemplary element of the extrinsic lidar calibrator 120 for determining vehicle position pairs, according to some embodiments.

FIG. 1B illustrates a block diagram of an exemplary vehicle position pairs determiner 160 that can be used for determining vehicle position pairs, according to some embodiments. The vehicle position pair(s) determiner 160 receives the positions of the vehicle 154. The positions of the vehicle 154 are determined based on lidar returns of a first one of the lidar devices, e.g., lidar device 110A, when the vehicle moves along the path 109 according to a predetermined path pattern. The positions of the vehicle 154 can be expressed in the world coordinate system 200. In other embodiments, the positions of the vehicle 154 can be expressed in the vehicle coordinate system. The position pairing unit 161 pairs distinct ones of the positions of the vehicle to obtain a set of pairs of the positions. Each one from the set of pairs includes a position of the vehicle at a first time and another position of the vehicle at a different time.

The position pairs filter 165 is operative to output a subset of the vehicle positions pairs 155. The pair selector 162 selects a pair from the pairs 155, e.g., P1 at time t1 and P2 at time t2. The bounding box generator 163 generates for each pair, e.g., (P1, P2) from the set of pairs a first bounding box representative of a FOV of the first lidar device 110A when the vehicle is located at the position P1, and a second bounding box representative of a FOV of the second lidar device 110B when the vehicle is at the position P2.

Figure 2B:
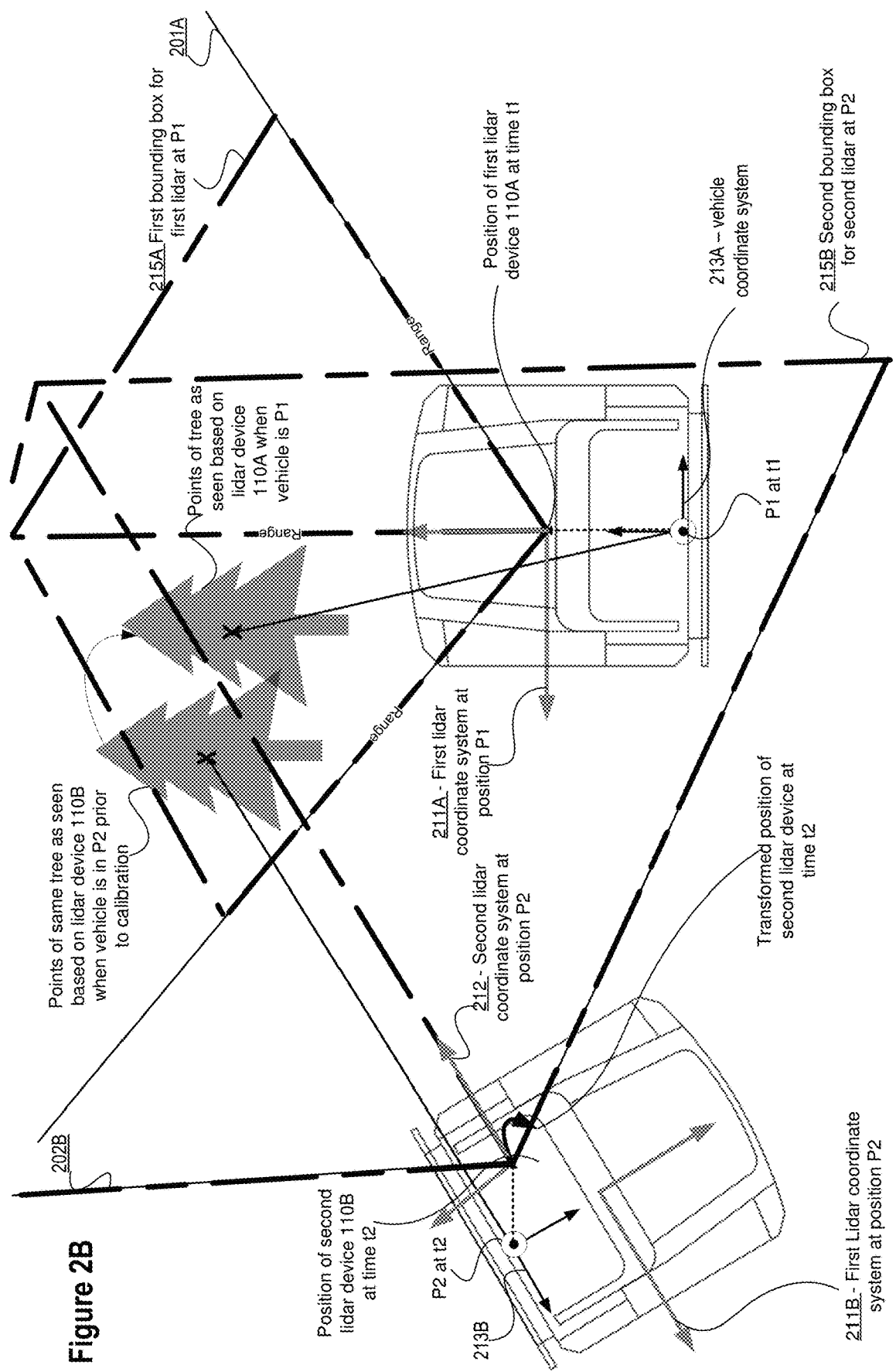
FIG. 2B illustrates a block diagram illustrating exemplary overlapping fields of view of lidar devices of a vehicle, according to some embodiments.

FIG. 2B includes exemplary first and second bounding boxes 215A-B that are generated for each one of the first position P1 and the second position P2. A bounding box may take one of several shapes for representing the FOV of each one of the first and the second lidar devices, e.g., a rectangle, a polygon, a circle, etc. In some embodiments, the bounding box is generated based on a nominal range of the lidar device. For example, four points are calculated based on the nominal range and the position of the lidar device. These four points are joint as a polygon to form the bounding box for a lidar device.

The FOV overlap determiner 164, determines whether the first bounding box and the second bounding box overlap above a predetermined threshold. Responsive to determining that the first bounding box and the second bounding box overlap above a predetermined threshold, the FOV overlap determiner 164 adds the pair of positions to the subset 156 of pairs of the positions of the vehicle. FIG. 2B shows that the first and the second bounding boxes overlap and have a common area. The size of the common area is compared to a predetermined area threshold for determining whether or not the FOVs of the first and the second lidar devices overlap. In some embodiments, the area threshold can be determined experimentally.

This process is repeated for the multiple pairs of the vehicle positions. For example, this can be performed for a third position of the vehicle and a fourth position of the vehicle where the FOV of two different lidar devices overlap. In addition, this process can be performed for other pairs of positions where no FOV of the lidar devices overlaps. These pairs of positions are filtered out, i.e., they are not included in the subset 156 of pairs of positions of the vehicle. Thus, upon determining for a pair of positions whether FOVs of two different lidar devices overlap or not, the position pairs filter 165 moves to processing another pair from the pairs of vehicle positions. This filtering process is repeated for all of the pairs of positions determined at the position pairing unit 161.

Figure 1C:
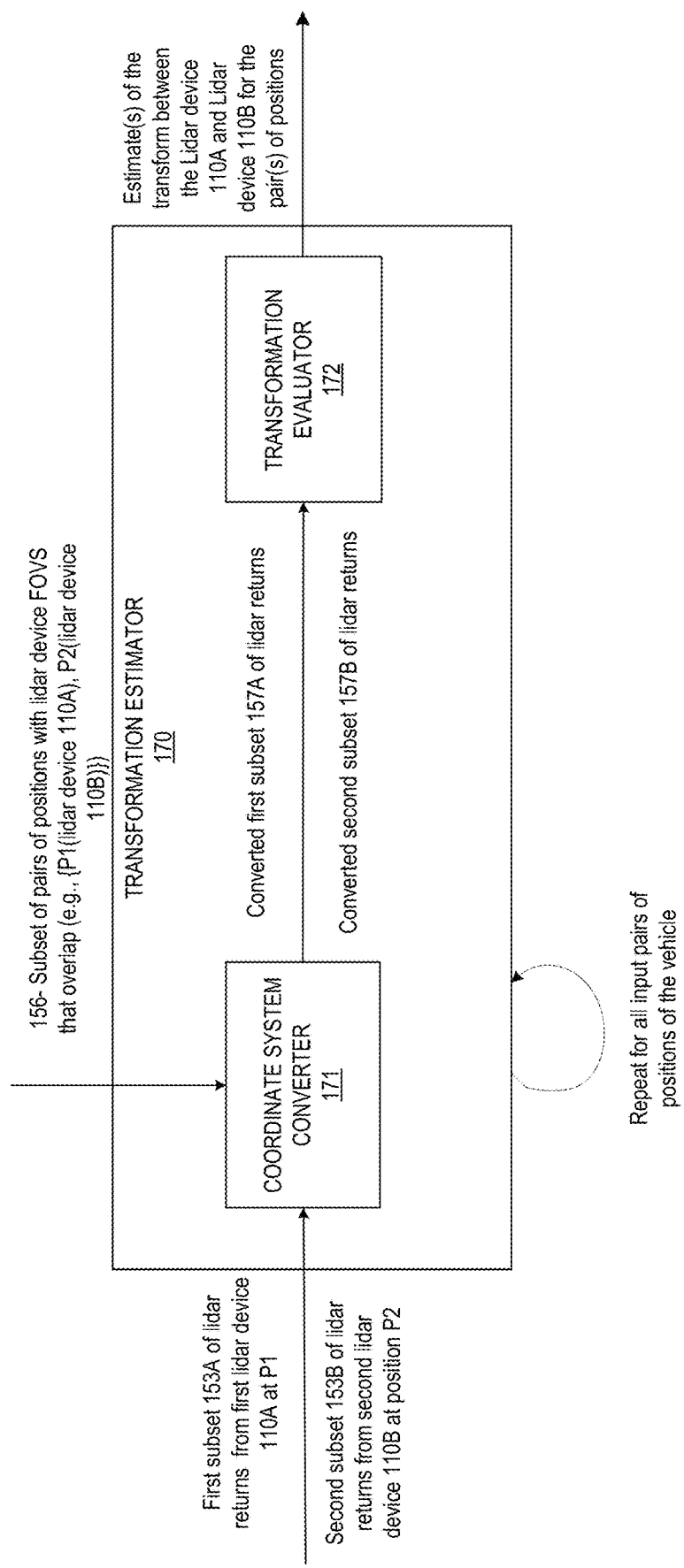
FIG. 1C illustrates a block diagram of an exemplary element for estimation of a transformation between two lidar devices, according to some embodiments.

FIG. 1C illustrates a block diagram of an exemplary element for estimating a transformation between two lidar devices, according to some embodiments. A first subset 153A of lidar returns captured by the first lidar device 110A, and a second subset of lidar returns 153B captured by the second lidar device 110B. The first subset 153A of lidar returns is output by the first lidar device 110A when the vehicle is located at the first position P1 at time t1. The second subset 153B of lidar returns is output by the second lidar device 110B when the vehicle is located at the second position P2 at time t2. The transformation estimator 170 further receives the subset of pairs of positions of the vehicle. The subset of pairs of positions of the vehicle have respective FOVs of associated lidar devices (e.g., lidar device 110A at position P1 and lidar device 110B at position P2) that overlap.

The coordinate system converter 171 converts the first subset of the lidar returns into a converted first subset 157A of the lidar returns in a first lidar coordinate system of the first lidar device when the vehicle was located at the second position P2. In some embodiments, the first subset of the lidar returns may have been expressed in the first lidar coordinate system 211A when the vehicle was located at the first position P1. In this embodiment, the first subset of the lidar returns is converted into a converted first subset of the lidar returns by transforming the coordinates of the first subset of the lidar returns from the first lidar coordinate system 211A when the vehicle is at position P1 at time t1 to the first lidar coordinate system 211B when the vehicle 102 is at position P2 at time t2.

The coordinate system converter 171 converts the second subset of the lidar returns into a converted second subset 157B of the lidar returns in the first lidar coordinate system when the vehicle was located at the second position. In some embodiments, the second subset of the lidar returns may have been expressed in the second lidar coordinate system 212A when the vehicle was located at the second position P2. In this embodiment, the second subset of the lidar returns is converted into converted second subset of the lidar returns by transforming the coordinates of the second subset of the lidar returns from the second lidar coordinate system 212 when the vehicle is at position P2 at time t2 to the first lidar coordinate system 211B, when the vehicle 102 is at position P2 at time t2. The transformation evaluator 172 calculates the estimate of the transformation based on the converted first subset of the lidar returns and the converted second subset of the lidar returns. In some embodiments, the calculation of the estimate of the transformation is performed by a mechanism that minimizes the difference between two point clouds (here the point clouds being the converted first subset of the lidar returns and the converted second subset of the lidar returns) and tries to align these two point clouds together, consequently producing an estimate of the residual transformation needed to align the point clouds. For example, an iterative closest point (ICP) algorithm can be used to minimize the difference between the converted first subset and the converted second subset of the lidar returns.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different from those discussed with reference to the flow diagrams.

Figure 3A:
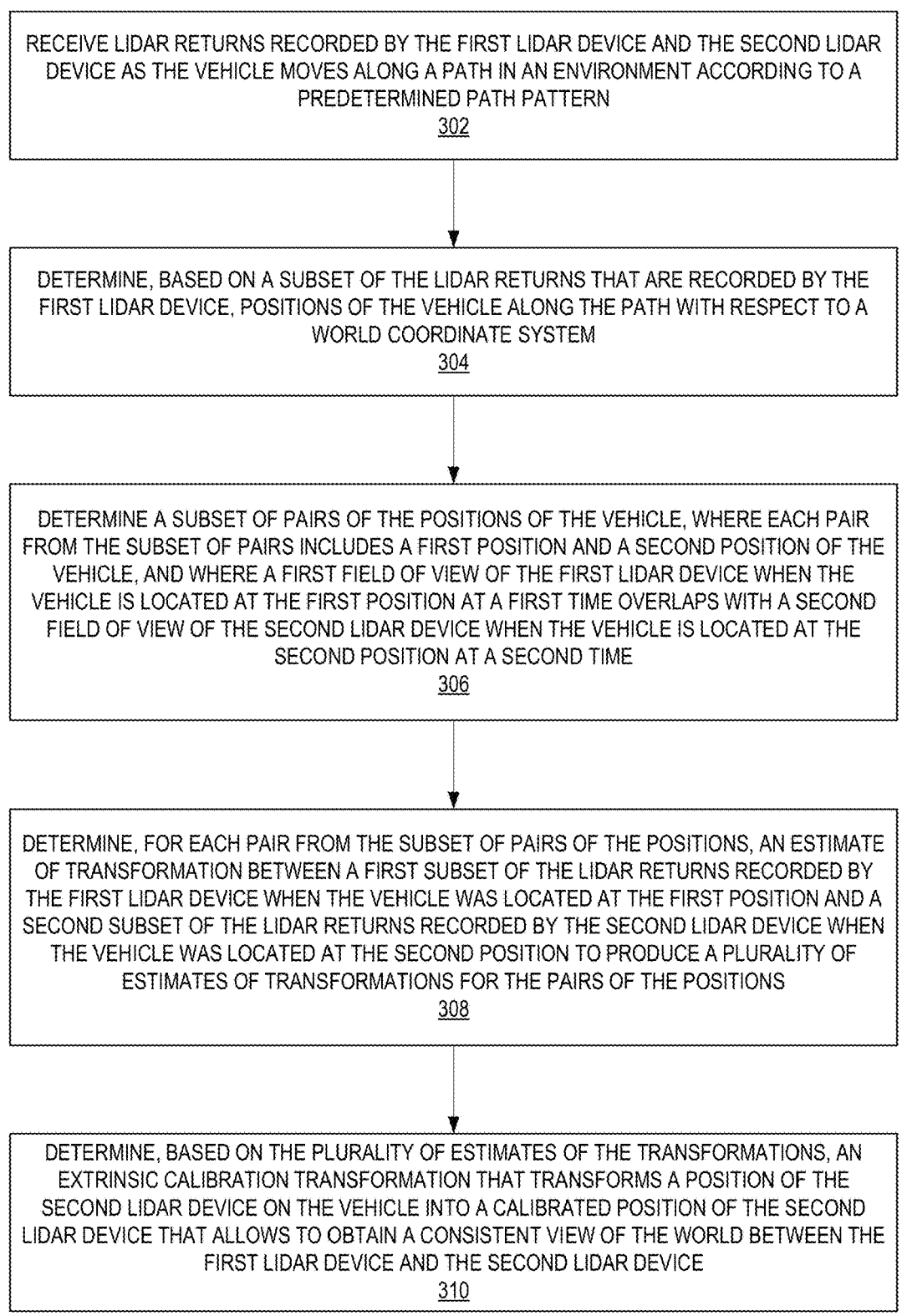
FIG. 3A illustrates a flow diagram of exemplary operations for calibration of a first lidar device and a second lidar device from a plurality of lidar devices that are mounted on a vehicle, according to some embodiments.

FIG. 3A illustrates a flow diagram of exemplary operations for calibration of a first lidar device and a second lidar device from a plurality of lidar devices that are mounted on a vehicle, according to some embodiments. While the embodiments herein will be described with reference to the first lidar device 110A and the second lidar device 110B, one of ordinary skill in the art would understand that similar operations are performed for the third lidar device 110C for calibrating the third lidar device 110C with respect to the first lidar device 110A. When more lidar devices are mounted on the vehicle 102, the operations described herein can be performed for each one of the additional lidar devices with respect to the first lidar device.

At operation 302, lidar returns are received. The lidar returns are recorded by the first lidar device and the second lidar device as the vehicle moves along a path in an environment according to a predetermined path pattern. The predetermined path pattern causes the first and the second lidar device to output lidar returns with FOV that overlap over time. For example, the vehicle can be configured to move along the path 109. In other embodiments, the vehicle can be configured to move along a different path. For example, the pattern of the path 109 can be a circle, or any closed curve that causes the multiple lidar devices 110A-C to obtain overlapping fields of view over time. For example, the pattern of the path 109 causes FOV 201A of lidar device 110A when the vehicle is at the position P1 at time t1 to overlap with the FOV 202B of lidar device 110B when the vehicle is at the position P2 at time t2. When the vehicle is at position P1 at time t1, FOV 201B of lidar device 110B overlaps with FOV 202B when the vehicle is at operation P2 at time t2. In some embodiments, the pattern of the path 109 may cause a total overlap of FOVs of two different lidar devices. In other embodiments, the path pattern may cause a partial overlap of FOVs of two different lidar devices.

The flow of operations moves to operation 304. At operation 304, positions of the vehicle 102 along the path are determined with respect to a world coordinate system. The positions of the vehicle are determined based on a subset of the lidar returns 152 that are recorded by the first lidar device. The subset of lidar returns are lidar returns of a single lidar device. For example, the lidar returns 151A of the first lidar device 110A are selected from the set of lidar returns 152. In some embodiments, the lidar returns 151A are selected based on the identifier of the first lidar device 110A. In this embodiment, all lidar returns stored in the datastore 130 associated with the identifier of the lidar device 110A are retrieved by the vehicle position determiner 140. The lidar device 110A can be identified as the reference lidar device for performing the calibration between the lidar devices 110A-C.

The lidar returns 151A of the lidar device 110A are used by the vehicle position determiner 140 to determine positions of the vehicle in the world. For example, the positions of the vehicle can be determined in a global coordinate system. The world coordinate system 200 in FIG. 2A is representative of an exemplary world coordinate system in which the positions of the vehicle can be expressed. The positions of the vehicle 102 can be the positions of the reference point 104 taken over time when the vehicle moves along the path 109. In some embodiments, the vehicle position determiner 140 can use the lidar returns 151A expressed in the first lidar coordinate system 211A (illustrated in FIG. 2B) of the lidar device 110A to determine the positions of the vehicle. In an alternative embodiment, the vehicle position determiner 140 can use the lidar returns 151A expressed in the vehicle coordinate system 201 (FIG. 2A). In some embodiments, the determination of the positions of the vehicle in the world based on the lidar returns 151A can be performed based on a simultaneous localization and mapping (SLAM) method. In some embodiments, the vehicle position determiner 140 may use additional sensor information for determining the positions of the vehicle. For example, the vehicle position determiner 140 may use accelerometer, gyroscope, wheel speed, and/or Global Positioning System (GPS) information.

The flow of operations moves to operation 306. At operation 306, a subset of pairs of the positions of the vehicle are determined. Each pair from the subset of pairs includes a first position and a second position of the vehicle, and a first FOV of the first lidar device 110A when the vehicle is located at the first position P1 at a first time t1 that overlaps with a second FOV of the second lidar device 110B when the vehicle is located at the second position P2 at a second time t2. FIG. 2B illustrates a block diagram illustrating exemplary overlapping fields of view of lidar devices of a vehicle, according to some embodiments. The vehicle position pair(s) determiner 160 can be implemented as discussed in further detail with reference to FIG. 1B. The vehicle position pair(s) determiner 160 may determine a first pair of positions (P1, P2) where each position of the pair is associated with a respective one of the lidar devices, e.g., lidar device 110A for position P1 and lidar device 110B for position P2. The FOV 201A of lidar device 110A when the vehicle is at position P1 at time t1 overlaps with the FOV 202V of lidar device 110B when the vehicle is at position P2. While a single pair of positions will be discussed in further details below, the vehicle position pairs determiner 160 outputs a subset of pairs of the vehicle, where for each pair from the subset of pairs a first position of the pair is associated with a lidar device, and a second position of the pair is associated with another lidar device that is different from the lidar device, and where the FOVs of each one of the lidar device and the other lidar device overlap.

The flow of operations moves to operation 308. At operation 308, for each pair from the subset of pairs of the positions, an estimate of transformation between a first subset of the lidar returns 151A and the second subset of the lidar returns 151B is determined. The first subset of the lidar returns 151A were recorded by the first lidar device 110A when the vehicle was located at the first position P1, and the second subset of the lidar returns 151B were recorded by the second lidar device 110B when the vehicle was located at the second position P2. For example, the transformation estimator 170 determines a transformation based on lidar returns recorded by the first lidar device 110A and lidar returns recorded by the second lidar device 110B. The transformation maps the points forming the tree 103 as seen by the second lidar device 110B when the vehicle is at P2 into the points of the tree 103, as seen by the first lidar device 110A when the vehicle is at P1. This transformation is applied to the position of the lidar device 110B to generate a transformed position of the second lidar device 110B at time t2. In some embodiments, the output of the transformation estimator 170 may be the transformed position of the lidar device 110B for the pair (P1 (lidar device 110A), P2 (lidar device 110B)). In some embodiments, the output of the transformation estimator 170 may be the transformation that maps the position of the lidar device 110B to the transformed position of the lidar device 110B for the pair (P1 (lidar device 110A), P2 (lidar device 110B)). In some embodiments, the transformation estimator 170 repeats this process for each pair of the subset of pairs 156 and outputs multiple estimates 158 of the transformation. Each transformation estimates a position of the lidar device 110B that provides a consistent view of the world between the first lidar device 110A and the second lidar device 110B. The consistent view of the world is obtained when the objects in the environment detected with the first lidar device 110A have the same positions as when detected with the second lidar device 110B.

The flow of operations moves to operation 310. At operation 310, the multiple estimates of the transformation are used to determine an extrinsic calibration transformation that transforms a position of the second lidar device on the vehicle into a calibrated position of the second lidar device that allows to obtain a consistent view of the world between the first lidar device and the second lidar device. The determination of the extrinsic calibration transformation includes performing an optimization across all of the estimates of the transformation determined for all the pairs of the subset of pairs 156 to find a transformation that minimizes the error across all of the estimates.

Figure 3B:
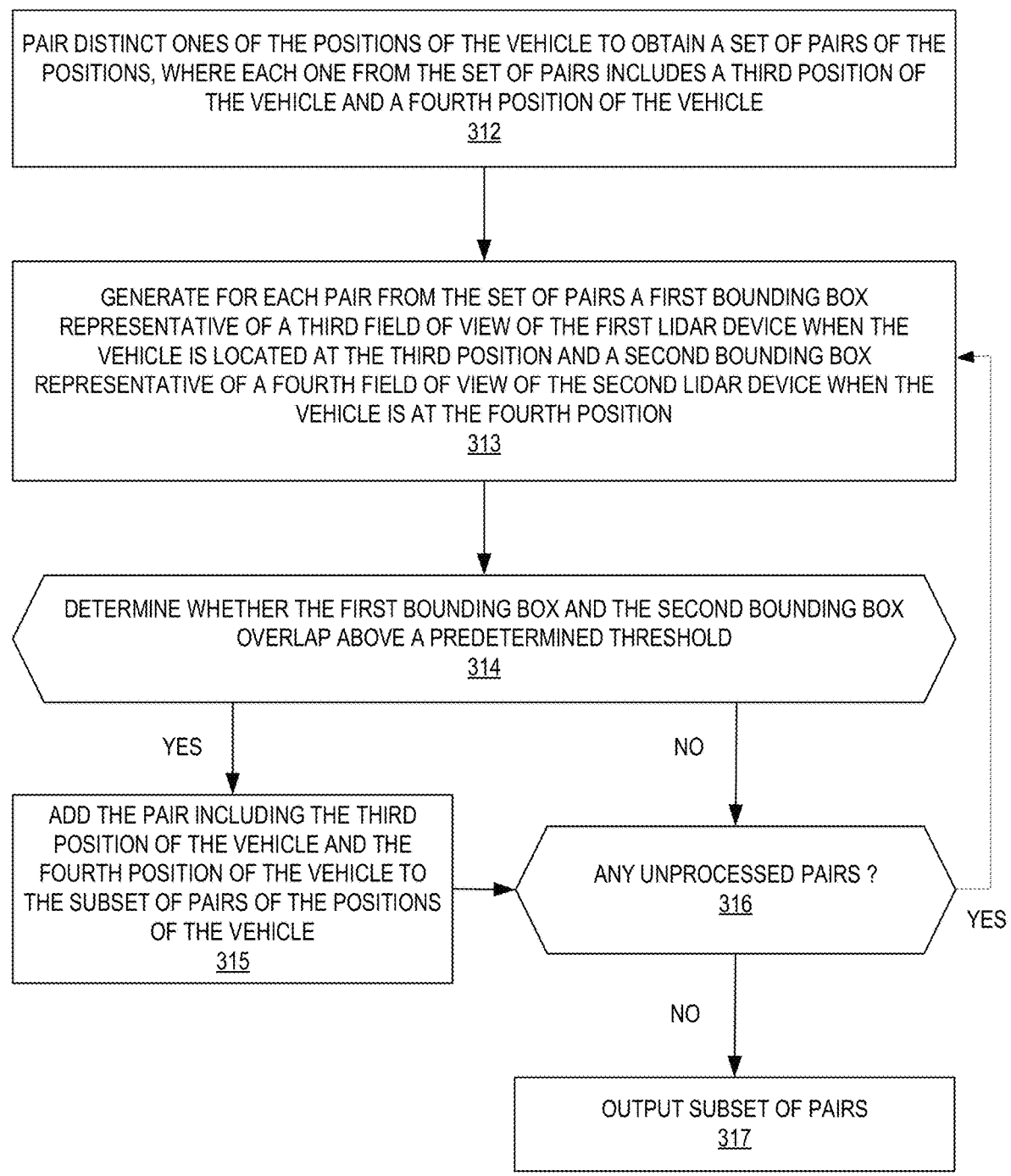
FIG. 3B illustrates a flow diagram of exemplary operations for determining a subset of pairs of vehicle positions, according to some embodiments.

FIG. 3B illustrates a flow diagram of exemplary operations for determining a subset of pairs of vehicle positions, according to some embodiments. At operation 312, distinct ones of the positions of the vehicle are paired to obtain a set of pairs of the positions. Each one from the set of pairs includes a third position of the vehicle and a fourth position of the vehicle. The third position of the vehicle is a position of the vehicle at a time t3, and the fourth position of the vehicle is a position of the vehicle at a different time t4 when the vehicle moves along the path 109. In some embodiments, the set of pairs includes the pair (P1, P2). The set of pairs includes additional pairs of positions that are different from the pair (P1, P2). In some embodiments, the set of pairs includes all the pairs that can be formed with two distinct positions from the positions of the vehicle. Thus, each pair includes a position and another position that is different from the position. Each pair includes positions of the vehicle at different times when the vehicle moves along the path with the predetermined path pattern, e.g., path 109.

The flow of operations moves to operation 313. At operation 313, for each pair, e.g., (P1, P2) from the set of pairs a first bounding box and a second bounding box are generated. The first bounding box is representative of a FOV of the first lidar device 110A when the vehicle is located at the position P1. The second bounding box is representative of a FOV of the second lidar device 110B when the vehicle is at the position P2. In one exemplary embodiment, the first and the second bounding boxes can be generated for the positions P1 and P2 as illustrated in FIG. 2B. Other bounding boxes (e.g., different range, different shape) can be contemplated without departing from the scope of the present embodiments.

The flow of operations moves to operation 314. At operation 314, a determination of whether the first and the second bounding boxes overlap above a predetermined threshold is performed. Responsive to determining that the first bounding box and the second bounding box overlap above a predetermined threshold, the flow of operations moves to operation 315. At operation 315, the pair of positions is added to the subset 156 of pairs of the positions of the vehicle. For example, upon determining that the first bounding box and the second bounding box for the first position P1 and the second position P2 overlap over the predetermined threshold, the pair (P1, P2) is added to the subset of pairs of the positions of the vehicle. When the pair is added to the subset of pairs, the flow of operations moves to operation 316. At operation 316, a determination of whether there are any unprocessed pairs of positions left is performed. Upon determining that pairs of positions are still to be processed the flow of operations moves to operation 313, at which the process is repeated for the remaining pairs of positions from the set of pairs. Upon determining that pairs of all pairs of positions from the set of positions have been processed, the flow of operations moves to operation 317. At operation 317, the subset of pairs of positions is output.

FIG. 3C illustrates a flow diagram of exemplary operations for transformation estimation, according to some embodiments. At operation 322, the first subset of the lidar returns is converted into a converted first subset of the lidar returns in a first lidar coordinate system of the first lidar device when the vehicle was located at the second position P2. In some embodiments, the first subset of the lidar returns may have been expressed in the first lidar coordinate system 211A when the vehicle was located at the first position P1. In this embodiment, the first subset of the lidar returns is converted into converted first subset of the lidar returns by transforming the coordinates of the first subset of the lidar returns from the first lidar coordinate system 211A when the vehicle is at position P1 at time t1 to the first lidar coordinate system 211B when the vehicle 102 is at position P2 at time t2. The flow of operations moves to operation 324. At operation 324, the second subset of the lidar returns is converted into a converted second subset of the lidar returns in the first lidar coordinate system when the vehicle was located at the second position. In some embodiments, the second subset of the lidar returns may have been expressed in the second lidar coordinate system 212A when the vehicle was located at the second position P2. In this embodiment, the second subset of the lidar returns is converted into converted second subset of the lidar returns by transforming the coordinates of the second subset of the lidar returns from the second lidar coordinate system 212 when the vehicle is at position P2 at time t2 to the first lidar coordinate system 211B when the vehicle 102 is at position P2 at time t2.

The flow of operations moves to operation 326. At operation 326, the estimate of the transformation is calculated based on the converted first subset of the lidar returns and the converted second subset of the lidar returns. In some embodiments, the calculation of the estimate of the transformation is performed by a mechanism that minimizes the difference between two point clouds, here the point clouds being the converted first subset of the lidar returns and the converted second subset of the lidar returns. For example, an iterative closest point (ICP) algorithm can be used to minimize the difference between the converted first subset and the converted second subset of the lidar returns.

FIG. 3D illustrates a flow diagram of exemplary operations for determining an intrinsic calibration, according to some embodiments. The intrinsic calibration allows to produce lidar returns for the second and the first lidar devices with similar intensity values.

In some embodiments, determining the intrinsic calibration includes operations 332-336. At operation 332, a third subset of the lidar returns recorded by the second lidar device is transformed based on the extrinsic calibration transformation to obtain a calibrated third subset of the lidar returns. The flow then moves to operation 334. At operation 334, the calibrated third subset of the lidar returns is aggregated with a fourth subset of the lidar returns recorded by the first lidar device into a three-dimensional grid of cells that is representative of the environment. In some embodiments, each one of the third subset of the lidar returns and the fourth subset of the lidar returns are lidar returns recorded by the second lidar device and the first lidar device respectively, over a period of time. For example, the lidar returns may have been recorded over a few seconds (e.g., 30 seconds), or a few minutes (e.g., 5, 10, or 30 minutes, etc.).

The flow of operations moves to operation 334. At operation 334, the intrinsic calibration transformation is determined based on lidar returns from the third subset and the fourth subset that hit the same cell in the three-dimensional grid of cells.

The calibration system is operative to transmit the calibration transformation and the extrinsic calibration transformation to the compute system 112 for calibrating the second lidar device 110B. In some embodiments, the extrinsic lidar calibrator 120 may transmit to the compute system 112 the transformed position of the second lidar device 110B instead of the extrinsic calibration. In some embodiments, instead of transmitting two distinct transformations, the extrinsic transformation and the calibration transformation, the calibration system 101 may transmit an aggregate transformation that concurrently applies the two transformations to lidar returns of the lidar device 110B. The second lidar device 110B is calibrated with respect to the first lidar device 110A. The calibration process performed by the calibration system 101 is repeated for each additional lidar device, e.g., lidar device 110C, for obtaining a calibration transformation and extrinsic calibration transformation associated with the additional lidar device. Upon receipt of the calibration transformation and the extrinsic calibration transformation (or transformed position of the second lidar device 110B), the compute system 112 is operative to process lidar returns captured by the lidar device 110B as transformed based on the calibration transformation and the extrinsic calibration transformation. The transformed lidar returns or calibrated lidar returns of the second lidar devices 110B allows the generation of a view of the environment of the vehicle 102 that is consistent across the two lidar devices 110A-B. In a consistent or coherent view of the environment, the same object, e.g., tree 103, is seen at the same location in the world when viewed by the first lidar device 110A and the second lidar device 110B after calibration. In some embodiments, the consistent and coherent view of the world enables the compute system to accurately use the outputs of the lidar devices to detect obstacles, localize against a map, plan a route for the vehicle, and perform other functions.

Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices, allowing them to communicate via wire through plugging in a cable to a physical port connected to a NIC. One or more parts of an embodiment of the invention may be implemented using different combinations of software, firmware, and/or hardware.

Figure 4:
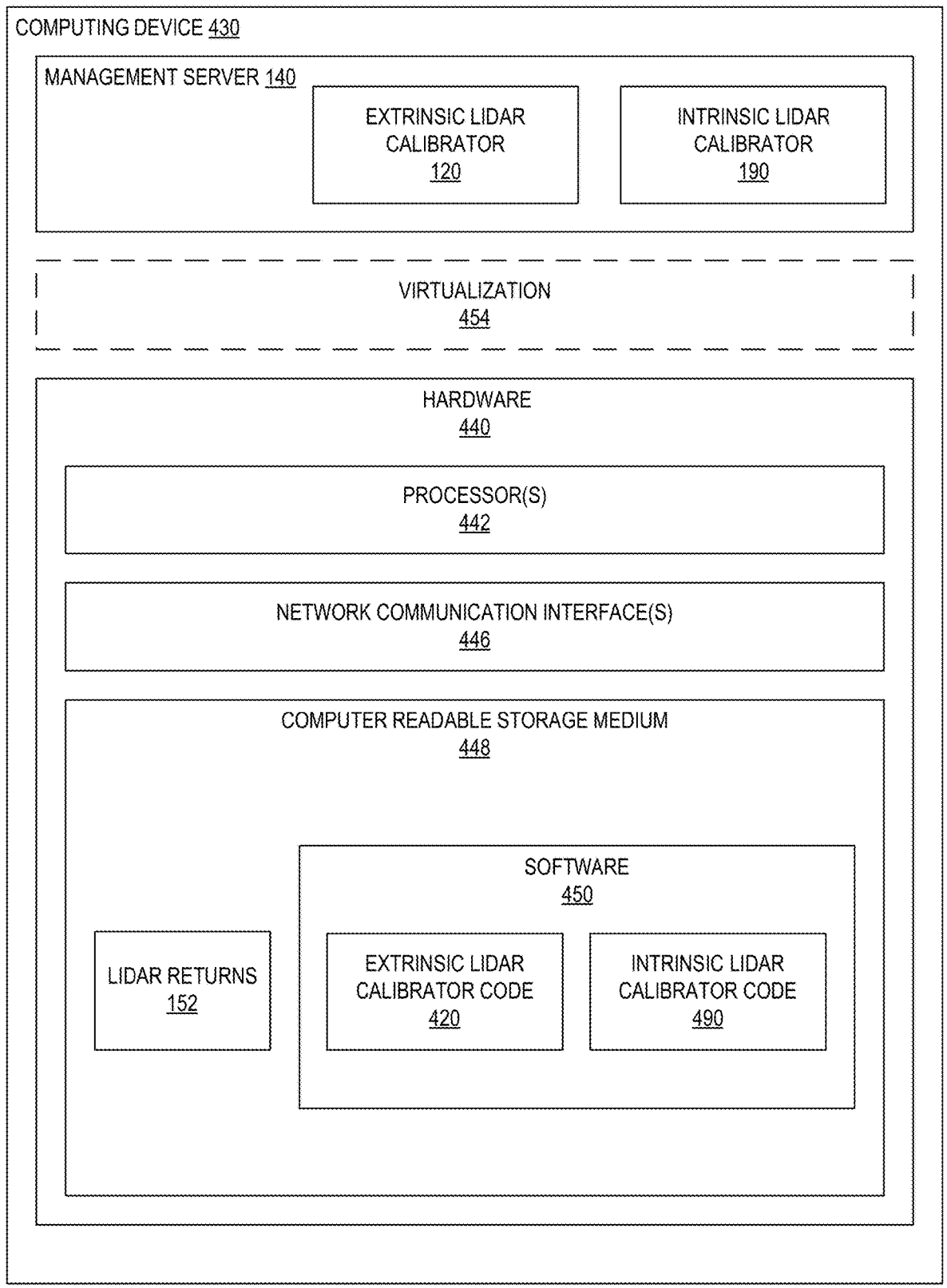
FIG. 4 illustrates a block diagram of an exemplary computing device that can be used for performing calibration of multiple lidar devices with non-overlapping fields of view, according to some embodiments.

FIG. 4 illustrates a block diagram of an exemplary computing device that can be used for performing calibration of multiple lidar devices with non-overlapping fields of view, according to some embodiments.

The computing device 430 includes hardware 440 comprising a set of one or more processor(s) 442 (which are often COTS processors) and physical network communications interfaces (NIs) 446, as well as non-transitory machine-readable storage media 448 having stored therein software 450. The software includes extrinsic lidar calibrator code 420 and an intrinsic lidar calibrator code 490. During operation, the processor(s) 442 execute the software 450 to instantiate one or more sets of one or more applications. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances called software containers that may each be used to execute one (or more) of the sets of applications; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications is run on top of a guest operating system within an instance called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances, or as a combination of unikernels and the above-described techniques (e.g., unikernels and virtual machines both run directly on a hypervisor, unikernels and sets of applications that are run in different software containers).

The instantiation of the one or more sets of one or more applications, as well as virtualization, if implemented, are collectively referred to as software instance(s). Each set of applications, corresponding virtualization construct if implemented, and that part of the hardware 440 that executes them (be it hardware dedicated to that execution and/or time slices of hardware temporally shared), forms a separate computing element(s) that is operative to perform the operations of an intrinsic lidar calibrator 190 and/or an extrinsic lidar calibrator 120.

One or more such computing devices 430 may be utilized to implement the functionality of the calibration system 101 as illustrated in FIGS. 1A-3D.

It will be appreciated that additional components, not shown, may also be part of the computing devices 430, and, in certain embodiments, fewer components than that shown in FIG. 4 may also be used in a data processing system 430. In some embodiments, the computing device 430 can be the compute system 112. In other embodiments, the computing device 430 can be located remotely from the vehicle and the compute system 112. For example, the computing device 430 may be included in a data center.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. For example, while the flow diagrams in the figures show a particular order of operations performed by certain embodiments of the invention, it should be understood that such order is exemplary. One having ordinary skill in the art would recognize that variations can be made to the flow diagrams without departing from the broader spirit and scope of the invention as set forth in the following claims (e.g., alternative embodiments may perform the operations in a different order, combine certain operations, overlap certain operations, etc.).

Some portions of the preceding detailed descriptions have been presented in terms of algorithms and symbolic representations of transactions on data bits within a computer and memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described and can be practiced with modification and alteration within the spirit and scope of the appended claims. The description is thus to be regarded as illustrative instead of limiting.

What is claimed is:

1. A method of calibration of a first lidar device and a second lidar device from a plurality of lidar devices that are mounted on a vehicle, the method comprising:
    determining a subset of pairs of positions of the vehicle as the vehicle moves in an environment along a path according to a predetermined path pattern, wherein each pair from the subset of pairs of positions includes a first position and a second position of the vehicle, and wherein a first field of view of the first lidar device when the vehicle is located at the first position at a first time overlaps with a second field of view of the second lidar device when the vehicle is located at the second position at a second time; and
    determining, based on the subset of pairs of positions, an extrinsic calibration transformation that transforms a position of the second lidar device on the vehicle into a calibrated position of the second lidar device that allows to obtain a consistent view of a world between the first lidar device and the second lidar device.

2. The method of claim 1 further comprising:
    determining, for one or more pairs from the subset of pairs of positions, one or more estimates of transformations between a first subset of lidar returns recorded by the first lidar device when the vehicle was located at the first position and a second subset of lidar returns recorded by the second lidar device when the vehicle was located at the second position.

3. The method of claim 2, wherein the determining the extrinsic calibration transformation is performed based on the one or more estimates of transformations for the subset of pairs of positions.

4. The method of claim 3, wherein the determining the extrinsic calibration transformation includes:
    performing an optimization that minimizes an error across the one or more estimates of transformations for the subset of pairs of positions.

5. The method of claim 1, wherein when the vehicle is stationary a field of view of the first lidar device does not overlap a field of view of the second lidar device.

6. The method of claim 1, wherein the determining the subset of pairs of positions of the vehicle includes:
    pairing distinct ones of positions of the vehicle as the vehicle moves along the path to obtain a set of pairs of the positions, wherein a pair from the set of pairs includes a third position of the vehicle and a fourth position of the vehicle;
    generating for the pair from the set of pairs a first bounding box representative of a third field of view of the first lidar device when the vehicle is located at the third position and a second bounding box representative of a fourth field of view of the second lidar device when the vehicle is at the fourth position; and
    responsive to determining that the first bounding box and the second bounding box overlap above a predetermined threshold, adding the pair including the third position of the vehicle and the fourth position of the vehicle to the subset of pairs of positions of the vehicle.

7. A non-transitory computer-readable storage medium that provides instructions, which when executed by a processor cause said processor to perform operations for calibration of a first lidar device and a second lidar device from a plurality of lidar devices that are mounted on a vehicle, the operations comprising:
    determining a subset of pairs of positions of the vehicle as the vehicle moves in an environment along a path according to a predetermined path pattern, wherein each pair from the subset of pairs of positions includes a first position and a second position of the vehicle, and wherein a first field of view of the first lidar device when the vehicle is located at the first position at a first time overlaps with a second field of view of the second lidar device when the vehicle is located at the second position at a second time; and
    determining, based on the subset of pairs of positions, an extrinsic calibration transformation that transforms a position of the second lidar device on the vehicle into a calibrated position of the second lidar device that allows to obtain a consistent view of a world between the first lidar device and the second lidar device.

8. The non-transitory computer-readable storage medium of claim 7, wherein the operations further comprise:
    determining, for one or more pairs from the subset of pairs of positions, one or more estimates of transformations between a first subset of lidar returns recorded by the first lidar device when the vehicle was located at the first position and a second subset of lidar returns recorded by the second lidar device when the vehicle was located at the second position.

9. The non-transitory computer-readable storage medium of claim 8, wherein the determining the extrinsic calibration transformation is performed based on the one or more estimates of transformations for the subset of pairs of positions.

10. The non-transitory computer-readable storage medium of claim 9, wherein the determining the extrinsic calibration transformation includes:
    performing an optimization that minimizes an error across the one or more estimates of transformations for the subset of pairs of positions.

11. The non-transitory computer-readable storage medium of claim 7, wherein when the vehicle is stationary a field of view of the first lidar device does not overlap a field of view of the second lidar device.

12. The non-transitory computer-readable storage medium of claim 7, wherein the determining the subset of pairs of positions of the vehicle includes:
    pairing distinct ones of positions of the vehicle as the vehicle moves along the path to obtain a set of pairs of the positions, wherein a pair from the set of pairs includes a third position of the vehicle and a fourth position of the vehicle;

generating for the pair from the set of pairs a first bounding box representative of a third field of view of the first lidar device when the vehicle is located at the third position and a second bounding box representative of a fourth field of view of the second lidar device when the vehicle is at the fourth position; and responsive to determining that the first bounding box and the second bounding box overlap above a predetermined threshold, adding the pair including the third position of the vehicle and the fourth position of the vehicle to the subset of pairs of positions of the vehicle.

13. A computing device for calibration of a first lidar device and a second lidar device from a plurality of lidar devices that are mounted on a vehicle, the computing device comprising:

a non-transitory computer-readable storage medium to store instructions; and a processor coupled with the non-transitory computer-readable storage medium to process the stored instructions to perform the following operations of:

determining a subset of pairs of positions of the vehicle as the vehicle moves in an environment along a path according to a predetermined path pattern, wherein each pair from the subset of pairs of positions includes a first position and a second position of the vehicle, and wherein a first field of view of the first lidar device when the vehicle is located at the first position at a first time overlaps with a second field of view of the second lidar device when the vehicle is located at the second position at a second time, and determining, based on the subset of pairs of positions, an extrinsic calibration transformation that transforms a position of the second lidar device on the vehicle into a calibrated position of the second lidar device that allows to obtain a consistent view of a world between the first lidar device and the second lidar device.

14. The computing device of claim 13, wherein the operations further comprise:

determining, for one or more pairs from the subset of pairs of positions, one or more estimates of transformations between a first subset of lidar returns recorded by the first lidar device when the vehicle was located at the first position and a second subset of lidar returns recorded by the second lidar device when the vehicle was located at the second position.

15. The computing device of claim 14, wherein the determining the extrinsic calibration transformation is performed based on the one or more estimates of transformations for the subset of pairs of positions.

16. The computing device of claim 15, wherein the determining the extrinsic calibration transformation includes:

performing an optimization that minimizes an error across the one or more estimates of transformations for the subset of pairs of positions.

17. The computing device of claim 13, wherein when the vehicle is stationary a field of view of the first lidar device does not overlap a field of view of the second lidar device.

18. The computing device of claim 13, wherein the determining the subset of pairs of positions of the vehicle includes:

pairing distinct ones of positions of the vehicle as the vehicle moves along the path to obtain a set of pairs of the positions, wherein a pair from the set of pairs includes a third position of the vehicle and a fourth position of the vehicle;

generating for the pair from the set of pairs a first bounding box representative of a third field of view of the first lidar device when the vehicle is located at the third position and a second bounding box representative of a fourth field of view of the second lidar device when the vehicle is at the fourth position; and responsive to determining that the first bounding box and the second bounding box overlap above a predetermined threshold, adding the pair including the third position of the vehicle and the fourth position of the vehicle to the subset of pairs of positions of the vehicle.

19. The method of claim 1, further comprising:

generating a first bounding box representative of the first field of view and a second bound box representative of the second field of view based on the subset of pairs of positions.

20. The method of claim 1, wherein an overlap of the first field of view and the second field of view is overtime.

* * * * *